United States Patent [19]

Huh

[11] Patent Number: 5,301,029
[45] Date of Patent: Apr. 5, 1994

[54] DEVICE FOR MAINTAINING THE CLEARANCE BETWEEN A CYCOLOR FILM AND THE HEAD OF FILM EXPOSING CRT

[75] Inventor: Byung-Mu Huh, Seoul, Rep. of Korea

[73] Assignee: Goldstar Co., Ltd., Seoul, Rep. of Korea

[21] Appl. No.: 802,673

[22] Filed: Dec. 5, 1991

[30] Foreign Application Priority Data

Dec. 7, 1990 [KR] Rep. of Korea ............... 90-20139

[51] Int. Cl.⁵ .................... H04N 3/36; H04N 5/253
[52] U.S. Cl. ................................. 348/97; 348/104
[58] Field of Search ............. 358/214, 215, 216, 229, 358/209, 54, 97; 352/34, 150, 220, 222; 346/110 R; 355/20, 1; 400/56; H04N 3/36, 3/40, 2/253

[56] References Cited

U.S. PATENT DOCUMENTS

| | | | |
|---|---|---|---|
| 4,038,498 | 7/1977 | Richards | 178/15 |
| 4,394,089 | 7/1983 | McIntosh | 355/88 |
| 4,506,300 | 3/1985 | Fearnside | 358/225 |
| 4,575,267 | 3/1986 | Brull | 400/56 |
| 4,855,836 | 8/1989 | Shearer | 358/214 |
| 4,903,131 | 2/1990 | Lingemann | 358/214 |
| 5,172,987 | 12/1992 | Stellmach et al. | 400/56 |
| 5,193,918 | 3/1993 | Lohrmann et al. | 400/56 |

Primary Examiner—Joseph Mancuso
Assistant Examiner—Tuan V. Ho
Attorney, Agent, or Firm—Morgan & Finnegan

[57] ABSTRACT

A device for maintaining the clearance between the head of a film exposing CRT and a plate supported film that includes a plate that supports the film to be exposed is movably mounted in front of the head for maintaining the desired clearance at a constant distance so that the film can be exposed to the light rays emitted by the CRT, and a driving device for positioning the device for maintaining the desired clearance between the head of the CRT and the plate supported film.

2 Claims, 4 Drawing Sheets

DEVICE FOR MAINTAINING THE CLEARANCE BETWEEN A CYCOLOR FILM AND THE HEAD OF FILM EXPOSING CRT

BACKGROUND OF THE INVENTION

1. Field of the Invention

The present invention relates to a color video printer, and more particularly to a device for maintaining the clearance between a Cycolor film of the U.S. MEAD IMAGING CO. and the head of a film exposing CRT constant in a color video printer during transfer the Cycolor film.

2. Background Art

As shown in FIG. 1, the conventional color video printer using the Cycolor film comprises a film roll 3 carrying a film 3', a feeding roll 2 for feeding the film, a film exposing CRT 1 for exposing to light the film 3' fed by the feeding roll 2, the feeding roll 2 being mounted in one side of the film exposing CRT 1, first and second idler rolls 4a and 4b for guiding the film 3', a capstan roll 10 and pressure rolls 6 provided between the first and second idler rolls 4a and 4b for driving the film, and first and second guides 8 and 9 for cooperating with the first and second idler rolls 4a and 4b to guide the film.

A plurality of guide holes are provided in the edges of the film 3' receiving a plurality of projections 2a formed on the periphery of the feeding roll 2, so that when the feeding roll 2 is rotated clockwise, the film 3' moves in the direction of the arrow indicated in phantom line in FIG. 1 wound around a winding roll 5. The feeding roll 2 and winding roll 5 are driven by different motors.

Thus being loaded, the film 3' is exposed to light according to the signals generated by the head 1a of the film exposing CRT 1, and then the exposed film is impressed onto a printing paper 7 by means of the pressure roll 6 transferring the image thereof to the paper. Finally the paper containing the image is discharged.

In this case, when the film 3' is exposed to the light rays emitted by the head 1a of the film exposing CRT 1, the toner laid on the film 3' is hardened in conformity with the intensity and wavelength of the light rays. Hence, the light rays emitted from the head 1a towards the film 3' should be made not so as to diffuse by maintaining the clearance between the head 1a and film 3' constant.

However, since the conventional color video printer has no such means for maintaining the clearance between the head 1a and film 3' constant, the film 3' is not properly exposed so as to result in an unclear printed image.

SUMMARY OF THE INVENTION

The object of the present invention is to provide a color video printer wherein a device for maintaining the clearance between the head of a film exposing CRT and the film is provided in front of the head so as to expose the film properly.

According to the present invention, there is provided a device for maintaining the clearance between the head of a film exposing CRT and a film comprising a clearance maintaining means movably mounted in front of the head for maintaining the clearance between the head and film constant on exposing the film to the light rays emitted by the CRT, and a drive means provided in one side of the film maintaining means for driving it so as to position the film closely to or separate from the head.

The present invention will now be described with reference to the attached drawings only by way of example.

BRIEF DESCRIPTION OF THE DRAWINGS

FIG. 5 is a side view of the essential part of the device shown in FIG. 4, wherein

DETAILED DESCRIPTION OF THE INVENTION

As shown in FIGS. 2 to 6, a device for maintaining the clearance between the head 1a of a film exposing CRT 1 and a film 3' comprises a clearance maintaining means 20 for maintaining the clearance on exposing the film, and drive means 30 for driving the clearance maintaining means 20.

Figure 7A:
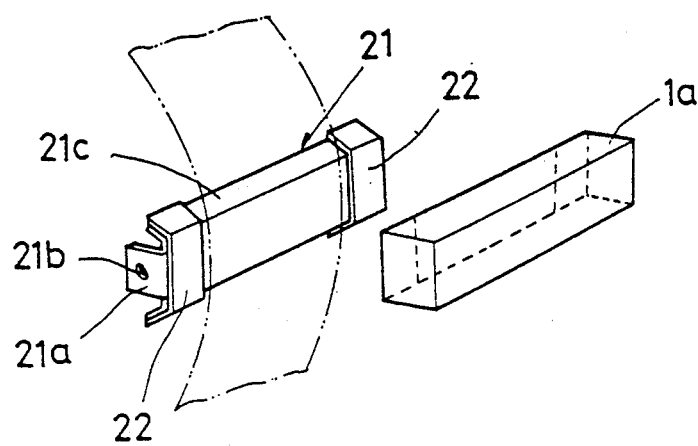
FIG. 7A is an exploded perspective view for illustrating an embodiment of the film supporting plate of the inventive device and CRT head.
Figure 7B:
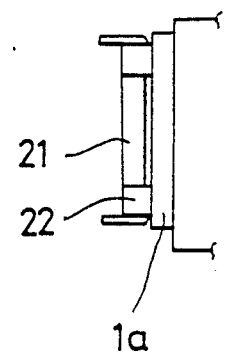
FIG. 7B is a plane view for illustrating the combined state of FIG. 7A.

The clearance maintaining means 20, as shown in FIGS. 7A and 7B, includes a pair of clearance maintaining strips 22 respectively attached to both end portions of a film supporting plate 21 so as to maintain a constant structural gap between the film supporting plate 21 and head 1a.

In addition, both ends of the film supporting plate 21 have a connecting strip 21a with a pivot hole 21b for connecting the clearance maintaining means 20 and drive means 30, and a close guide strip 21c is formed along at lest one of the edges of the film supporting plate so as to closely support the film 3' moving along a given path.

Figure 8A:
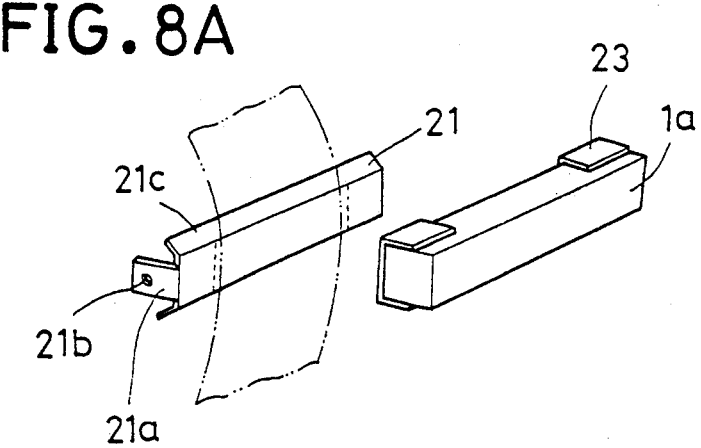
FIG. 8A is an exploded perspective view for illustrating another embodiment of the film supporting plate of the inventive device and CRT head.
Figure 8B:
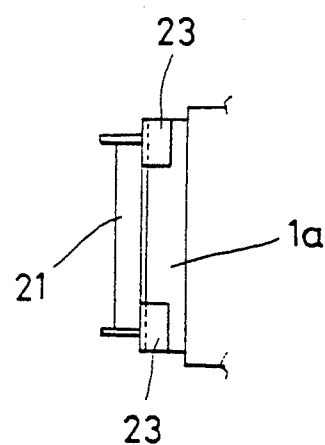
FIG. 8B is a plane view for illustrating the combined state of FIG. 8A.

Alternatively, as shown in FIGS. 8A and 8B, the clearance maintaining strip 23 may be attached to both ends of the head 1a, and the film supporting plate 21 as same as above. Then a constant gap may be maintained between the film supporting plate 21 and head 1a.

The clearance maintaining means 20 is contacted with or separated from the head 1a by the drive means 30.

Figure 6:
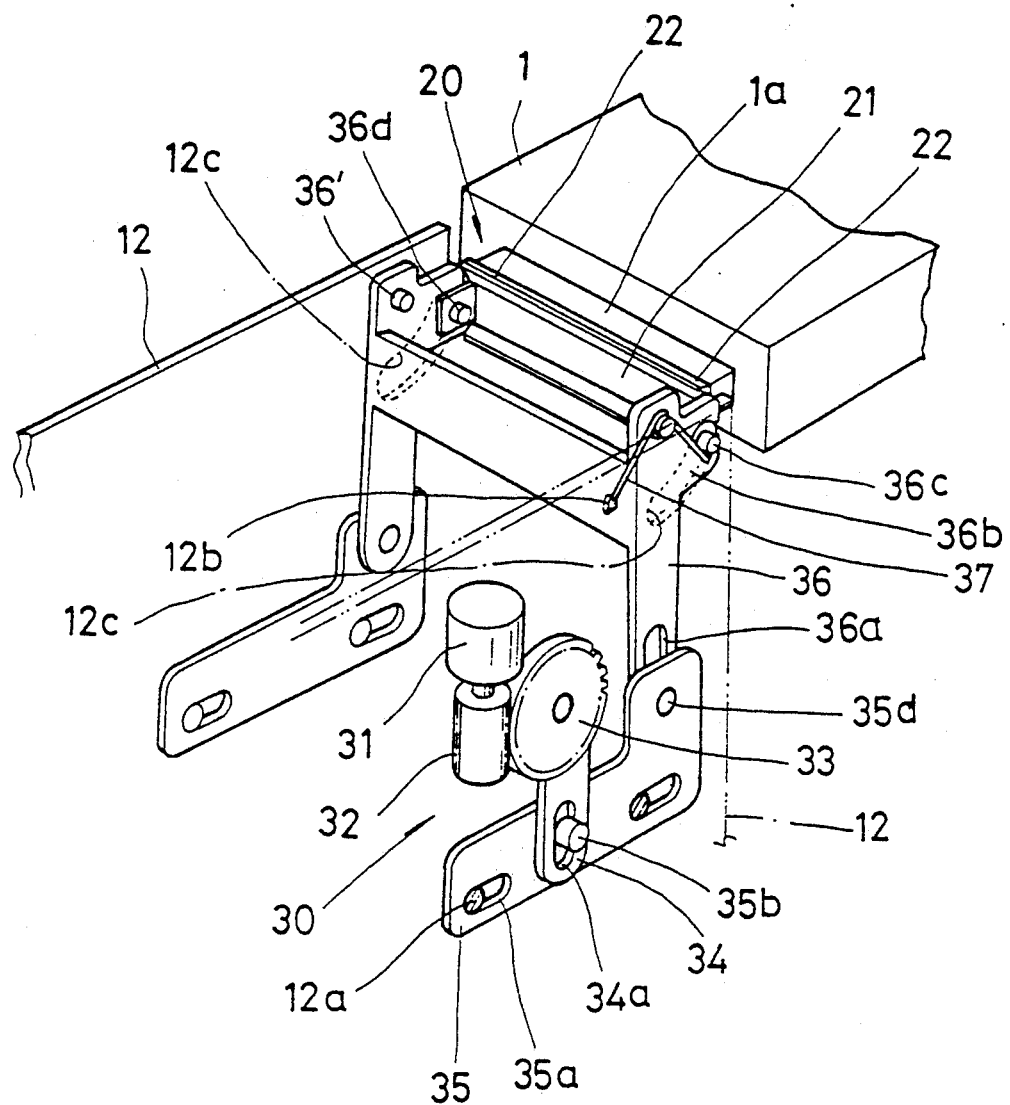
FIG. 6 is an overall perspective view of the inventive clearance maintaining means and drive means therefor.

The drive means for guiding the clearance maintaining means 20 to the head 1a, as shown in FIG. 6, comprises a motor 31, a worm 32 rotted by the motor 31, a worm gear 33 engaging with the worm 32, lever 34 fixed to the worm gear 33, a pair of function plates 35 mounted on main plates 12 so as to linearly reciprocate, a pair of pivot levers 36 respectively linked to the function plates so as to pivot for mounting the film supporting plate 21 of the clearance maintaining means 20, and a resilient means 37 for returning the pivot lever 36 so as to contact the film supporting plate 21 closely with the head 1a.

The pair of function plates 35 have an elongated opening 35a in both end portions for receiving a guide pin 12a fixed to the main plate 12. The extended part 35c of the function plate has a fixed connecting pin 35d inserted in the connecting opening 36a formed i the lower end portion of the pivot lever 36. One of the function plates 35 has an operating pin 35b fixed to the central portion inserted in the operating hole 34a formed in the lower end portion of the lever 34.

The pair of pivot levers 36 are pivotally mounted on the main plates 12 by pivots pin 36'. The pivot supporting portions 36b of the pivot levers 36 have further pivot pins 36c and 36d inserted in the pivot holes 21b of connecting strips 21a of the film supporting plate 21. In this case, the pivot supporting portions 36b of the pivot levers 36 and the connected strips 21a of the film supporting plate 21 may be connected with bearings between them for smooth pivoting.

Also a resilient member 37 of torsion spring is held by a shaft 36' of the pivot levers 36 with both ends respectively retained by the projection 12b of the main plate 12 and the pivot pin 36c, thus resiliently supporting the pivot levers 36 anticlockwise. The reference numeral 12c indicates arcuate guide openings formed in the main plates 12.

The operational effect of the present device will now be described.

Figure 1:
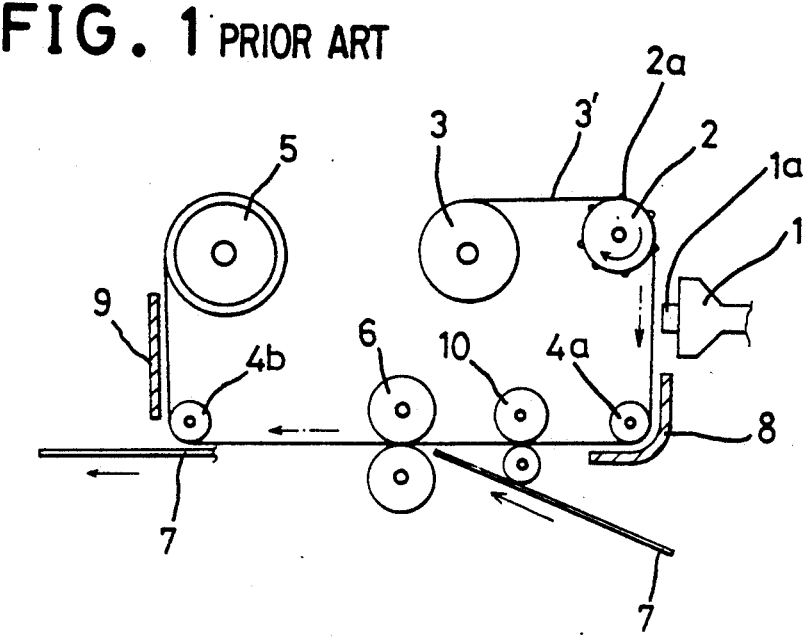
FIG. 1 is a schematic diagram for illustrating the overall structure of a conventional color video printer.
Figure 2:
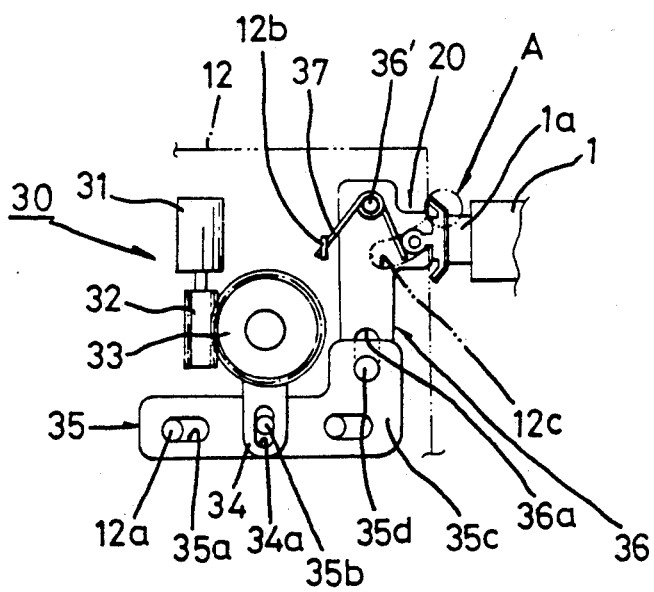
FIG. 2 is a side view of a device for maintaining the clearance between the head of a film exposing CRT and a film according to the present invention, illustrating the initial stopping position of the film and the state of the film closely contacting the head by means of a film supporting plate on exposing the film.
Figure 3:
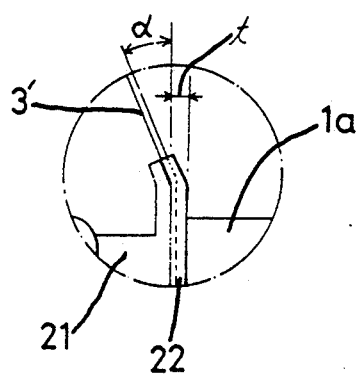
FIG. 3 is an enlarged view of the portion indicated by 'A' in FIG. 2.
Figure 4:
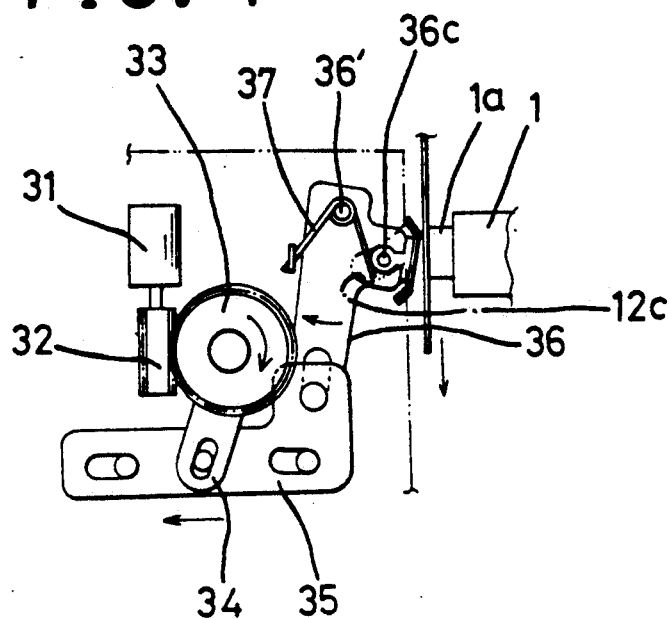
FIG. 4 is a view similar to FIG. 2 for illustrating the state of the film initially being loaded.
Figure 5A:
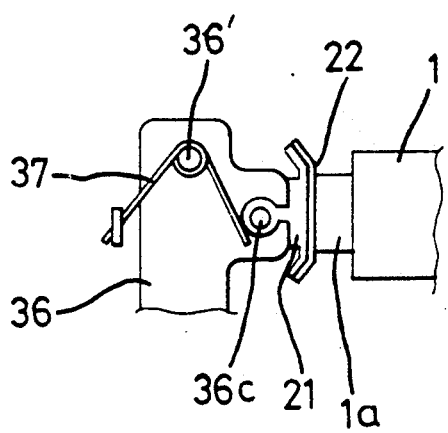
FIG. 5A is a side view for illustrating the head thereof horizontally positioned, and FIG. 5B the head inclined.

Referring to FIGS. 2 and 5A, the film supporting plate 21 closely contacts the head 1a by the resilient force of the resilient member 37 in the initial position. In order to feed the film 3' from the film roll 3, if the motor 31 is driven so as to move the function plates 35 leftwise, the pivot levers 36 turn on the shafts 36' clockwise, thus separating the film supporting plate 21 from the head 1a. Thereafter the feed roll 2 is driven so as to pass the film 3' between the film supporting plate 21 and head 1a for the initial loading of the film as shown in FIG. 1.

Then, as shown in FIG. 2, the motor 31 is reversely rotated so as to return the function plates 35 to the initial position, and the pivot levers 36 are rotated anti-clockwise so as to contact the film supporting plate 21 closely with the head 1a. Accordingly there is maintained a constant gap (t) between the film supporting plate 21 and the head 1a by the clearance maintaining strip 22, and thus the film 3' supported by the film supporting plate 21 at a given angle α is transferred while maintaining a constant clearance between the film 3' and head 1a.

Figure 5B:
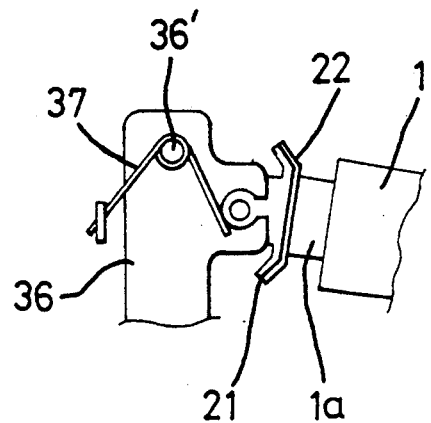

Moreover, since the film supporting plate 21 is pivotally mounted on the pivot levers 36 by the pivot pins 36c and 36d, the film supporting plate 21 smoothly pivots on the shafts 36c and 36d closely contacting the head 1a even if the head 1a takes an inclined position as shown in FIG. 5B instead of the horizontal position as shown in FIG. 5A.

Furthermore the inventive device uses a single motor rotated forwardly or reversely to make the initial feeding of the film 3' smooth and to maintain the clearance between the head 1a and film 3' constant on exposing the film.

As stated above, the clearance maintaining strips always maintains constant the clearance between the film and the head of the CRT (or LCD) of a color video printer using the Cycolor film when the film is exposed to the light rays emitted by the CRT, thus preventing the diffusion of the printed image. Furthermore, the film supporting plate may be separated from the head so as to smoothly feed the film in the initial leading of the film, and pivoted to accommodate to an inclined position of the CRT so as to always maintain the clearance between the film and the head.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A device for maintaining the clearance between a head of a film exposing CRT and a film in a color video printer, comprising:
   a clearance maintaining means movably mounted in front of the head for maintaining the clearance between said head and a plate supported film constant so as to precisely expose said film to light rays emitted by said CRT; and
   a drive means for driving said clearance maintaining means so as to adjust the clearance between said head and said plate supported film to form a constant gap therebetween,
   wherein said drive means comprises
   (a) a motor;
   (b) a worm driven by said motor;
   (c) a worm gear engaging with said worm;
   (d) a function plate for linearly reciprocating to a given distance by rotation of said worm and worm gear; and
   (e) a pivot lever mounted on a main plate for adjusting the gap between said clearance maintaining means and the head of said film exposing CRT in response to the reciprocating movement of said function plate.

2. A device according to claim 1, wherein said drive means further comprises a resilient means for closely contacting said clearance maintaining means with the head of said film exposing CRT.

* * * * *